United States Patent [19]

Chvatal

[11] 3,755,065

[45] Aug. 28, 1973

[54] OXIDIC SOLDER SEALING COMPOSITIONS AND THEIR USE IN FORMING LAMINATES

[75] Inventor: Theodor L. Chvatal, Vienna, Austria

[73] Assignee: Owens-Illinois, Inc., Toledo, Ohio

[22] Filed: May 11, 1971

[21] Appl. No.: 142,399

[52] U.S. Cl. .................... 161/192, 106/47, 156/89, 156/325, 161/196

[51] Int. Cl. ..... C03c 27/00, C09j 1/00, B32b 17/06

[58] Field of Search .......................... 161/192, 196; 156/89, 325; 106/47 R

[56] References Cited

UNITED STATES PATENTS

| | | | |
|---|---|---|---|
| 3,446,695 | 5/1969 | Janakirama-Rao | 161/192 |
| 3,454,408 | 7/1969 | Busdiecker | 156/89 X |
| 3,408,212 | 10/1968 | Dumesnil | 106/47 R |
| 3,469,729 | 9/1969 | Grekila et al. | 161/196 X |
| 3,445,210 | 5/1969 | Matsuzaki et al. | 156/325 X |
| 3,180,742 | 4/1965 | Bennett et al. | 161/196 X |
| 3,215,544 | 11/1965 | O'Connell et al. | 161/192 X |

*Primary Examiner*—Philip Dier
*Attorney*—Richard B. Dence and E. J. Holler

[57] ABSTRACT

An oxidic solder sealing composition is provided which is suitable for selectively joining relatively high expansion glasses, ceramics and metals to each other and in combination. The solder compositions comprise a binary admixture of vanadium pentoxide, $V_2O_5$, and silver oxide, $Ag_2O$, in the mole ratio ranging from 0.3 to 3.5 $Ag_2O$:1.0 $V_2O_5$, and more particularly in the molar ratio of 0.5 to 3.0 $Ag_2O$:1.0 $V_2O_5$. These solder compositions may be used in the form of rods, frit or powder, paste with conventional fugitive binders or solvents or as an aqueous suspension, such as in concentrated ammonia. In preparing these compositions, $AgNO_3$ is mixed with finely divided $V_2O_5$ and then the two components are fused together. Subsequently, the fused mass is cooled and thereafter may be ground into a powder. Laminates and sealed surfaces are prepared from the binary solder compositions.

13 Claims, No Drawings

3406

X 3497
X 3425
X 3589

OXIDIC SOLDER SEALING COMPOSITIONS AND THEIR USE IN FORMING LAMINATES

The present application relates to oxidic solder compositions, methods of making the oxidic solder compositions and articles prepared by using the solder compositions. Having relatively low melting temperatures and excellent wetting properties and relatively high coefficients of thermal expansion, the oxidic solder compositions of this invention are particularly suitable for selectively joining relatively high expansion glasses, ceramics and metals to each other or in any combination of these materials. The solder compositions of the present invention are crystalline materials, that is, non-glassy compositions, and have been observed to be semi-conducting. In addition to being useful as solder sealing agents, the compositions can also be used as fluxes for welding purposes.

In the sealing of glass, metal and ceramic surfaces to each other or to dissimilar surfaces, it is desirable to use low temperature solder compositions; not only because of simplification of handling but because low sealing temperatures avoid possible damage to high temperature sensitive articles such as micro-circuits and other delicate electronic equipment. A variety of glass compositions have been used for this purpose. Solder sealing glasses containing high lead content have low melting temperatures and are particularly useful for sealing purposes where heat distortion or heat damage should be minimized. However, lead containing compositions are undesirable in many instances where the lead causes contamination or interferes with the operation of the electronic apparatus.

Additional problems arise when seals are to be made between dissimilar materials of different expansion characteristics. Difficulties in matching the expansion coefficients of dissimilar materials of relatively high thermal expansion characteristics have resulted in poor bonds which lack adequate strength.

In the prior art it has been observed that poor seals or bonds are more often obtained when the solder composition is unable to sufficiently wet the surfaces to be sealed. This problem is particularly troublesome when sealing metal surfaces having an oxide film. In some instances it has been necessary to employ surface pretreatments or special protective atmospheres in order to obtain good bonding.

It is therefore an object of this invention to provide novel oxidic solders which have relatively low melting temperatures and good wetting characteristics.

It is a further object of the invention to provide novel oxidic solders which are suitable for sealing together dissimilar materials having different expansion properties.

It is a further object of the invention to provide novel oxidic solders which are suitable for sealing high temperature sensitive articles while avoiding the use of lead containing compositions.

It is a further object of the invention to provide a method of sealing surfaces with a composition which avoids the above-mentioned shortcomings and disadvantages of the prior art.

It is a further object of the invention to provide a method of sealing surfaces with an oxidic solder composition.

It is a still further object of the invention to provide sealed articles made by employing novel oxidic solder compositions.

In attaining the foregoing objects, one feature of the present invention resides in a binary oxidic sealing composition of silver oxide, $Ag_2O$, and vanadium pentoxide, $V_2O_5$, wherein the mole ratio of $Ag_2O$:$V_2O_5$ ranges from 0.3 to 3.5:1, more particularly 0.5 to 3.0:1.

A further feature of the present invention resides in making a finely divided oxidic solder composition by mixing a finely divided $V_2O_5$ powder in a melt of $AgNO_3$ at an elevated temperature, subsequently cooling the melt and then pulverizing the composition to obtain a finely divided solder composition.

A further feature of the present invention resides in a method of sealing a selected substrate, illustratively, glass, metal or ceramics, and especially surfaces having a relatively high coefficient of thermal expansion using as the sealing composition a binary admixture of $V_2O_5$ and $Ag_2O$ wherein the mole ratio of $Ag_2O$:$V_2O_5$ ranges from 0.3 to 3.5:1.

The above as well as other objects, features and advantages of the present invention will become apparent from the following detailed description thereof.

It is known in the prior art that pure $V_2O_5$ has a low electric resistance, a very high crystallizability, low melting temperature, low viscosity, good wetting properties, poor mechanical strength, poor chemical resistance. Some binary systems with $V_2O_5$ overcome some of the disadvantages of the $V_2O_5$ but in so doing lose some of the other advantages of $V_2O_5$ compositions. When $Ag_2O$ is introduced into $V_2O_5$ glasses in considerable amounts certain desirable properties are obtained. However, silver oxide is thermally unstable and decomposes at 300° C to form silver metal and oxygen. As a result, $Ag_2O$ cannot be introduced into high melting glasses in large amounts. Applicant has found that when $Ag_2O$ is combined with $V_2O_5$ at lower temperatures, thermally stable oxidic crystalline compositions are obtained.

In accordance with the more particular aspects of the invention concerning the binary system $Ag_2O$–$V_2O_5$, silver vanadates of the following complex formulae were prepared:

$$Ag_2O \cdot V_2O_5;\ 2Ag_2O \cdot V_2O_5 \text{ and } 3Ag_2O \cdot V_2O_5,$$

as will be apparent from the examples which follow hereinafter.

By employing a melt of $AgNO_3$ and adding to it the $V_2O_5$ in finely divided form, it is possible to produce water insoluble powders melting at about 350–450° C. In these melts the silver was not reduced all the way to the metallic state, particularly if there was some nitrate present. Cooled melts showed good adhesion on selected metals, glasses, ceramics and on carbon. These compositions can be used as solders for materials of relatively high thermal expansion properties and particularly if difficult combinations of materials are to be adhered together. Seals of this type may be made hermetically. It was further observed that even after quenching, the solder compositions based on $Ag_2O$ and $V_2O_5$ were crystalline. In addition, they are fine-grained and have sufficiently good mechanical strength. Typically the fine-grained crystalline materials exhibit an average particle size in the range of 0.2 to 20 microns. An important area for specific application for the solder compositions of this invention lies in the electronics field because of their semi-conducting properties. Illustratively, the resistivity values are about $10^6$.

It has been reported in the prior art that silver vanadate compositions can be prepared by precipitation from solutions of the corresponding sodium vanadates with a silver nitrate. Silver vanadates with intermediary compositions have also been investigated. See Roscoe; "Proc. Roy. Soc." 18, 316 and W. Prandtl and L. Hess "Z. Anorg. Chem.," 82 (1913) page 123.

Contrary to the prior art teachings, however, it has been found that binary compositions containing $Ag_2O$ and $V_2O_5$ can be prepared by a particular melting procedure. Thus, using finely grained $V_2O_5$, the vanadium pentoxide component is stirred into a melt of $AgNO_3$. The vanadium oxide reacts with $AgNO_3$ and $NO_2$ develops. The vanadium oxide stabilizes the $Ag_2O$ so that the melt can be heated above 600° C in air but less than 700° C. without formation of metallic silver. Generally, however, the temperature of the melt need not be that high since $AgNO_3$ melts at 209° C. With very high proportions of $Ag_2O$, formation at higher melting temperatures is possible, particularly if the $V_2O_5$ is not sufficiently fine-grained and the melt is heated for a very long time after decomposition of $AgNO_3$. This is the case for the melting of a batch of $3Ag_2O \cdot V_2O_5$. The chemical composition of the solid is:

| | |
|---|---|
| Silver | 14.1% |
| Silver oxide | 69.5% |
| Vanadium pentoxide | 16.4% |

The preparation of the samples was carried out by forming the melt in porcelain and alumina crucibles over gas flames. The melting was effected easily, with the alumina crucibles proving to be particularly suitable for this purpose. Seven different compositions are shown in the table which follows hereinafter. The chemical composition of three of these compositions was checked by chemical analysis. The melting point, density and electrical conductivity of all samples was determined. In certain cases the coefficient of thermal expansion was also measured. The results are given in the table below:

the invention are those wherein the mole ratio is 0.5 to 3.0 $Ag_2O$:1.0 $V_2O_5$.

All compositions were crystalline even if the cooling was carried out by quenching. Needle-like crystals were formed which were oriented in the direction of the temperature gradient. In samples having a high content of silver there was formed a fine crystalline condition wherein the average grain size was about 20 microns in diameter.

The soldering effect of all samples was investigated. Seals between glass and glass, steel and glass and aluminum with aluminum were prepared and the mechanical strength of the joints was compared qualitatively. It was found that the strength of the joints increased with an increasing content of silver oxide which is probably caused by finer grained conditions. The wetting properties and adhesion of these compositions was particularly excellent on materials made with compositions with a mole ratio of greater than 0.75, preferably 1.0 $Ag_2O$:1.0 $V_2O_5$. It is believed that silver ions may migrate into the glass and when in contact with metals, the silver is reduced to the metallic state. The melts also showed high tendency of migration into porous bodies so that only extremely dense materials or non-porous materials can be soldered if such migration is not desired. On the other hand, if great penetration into porous bodies is desired then these compositions are particularly useful for this purpose.

It is particularly significant that the solder compositions of the present invention exhibit good wetting capability for both oxides and metals. The wetting of oxides is due to the $V_2O_5$ component and the wetting of the metals is believed to be accomplished by the silver component. Furthermore, it is understood that in contact with metals, $Ag_2O$ is reduced to Ag which leads to the bonding. In addition, the solders have a good dissolving power for oxide layers on metals so that the soldering of metals is possible without pretreatment of the surface and without having to resort to use of protective atmospheres. Furthermore, prolonged heating of

TABLE I

| $Ag_2O/V_2O_5$ | Calculated Percent $Ag_2O$ | Calculated Percent $V_2O_5$ | Determined Percent $Ag_2O$ | Determined Percent $V_2O_5$ | Density, g./ml. | Melting temperature, ° C. | ρ Ohm-cm. | $\alpha(20\text{-}300°) \times 10^6/°$ C. |
|---|---|---|---|---|---|---|---|---|
| 0.5 | 38.89 | 61.11 | | | 4.74 | 620 | 5.7 | |
| 0.75 | 48.83 | 51.17 | | | 4.89 | 510 | $8.3 \times 10^1$ | 28.6 |
| 1.0 | 56.0 | 44.0 | 56.1 | 43.9 | 5.38 | 440 | $3.1 \times 10^3$ | 38.4 |
| 1.5 | 65.28 | 34.72 | | | 5.66 | 380 | $2.9 \times 10^6$ | |
| 2.0 | 71.63 | 28.37 | 71.9 | 28.1 | 5.98 | 380 | $8.4 \times 10^5$ | 27.3 |
| 2.5 | 76.21 | 23.79 | | | 6.05 | 420 | $1.2 \times 10^6$ | |
| 3.0 | 78.52 | 21.48 | 77.2 | 22.8 | 6.11 | 540 | $9.9 \times 10^7$ | 31.2 |

Samples formed wherein the mole ratio is 0.5 and 0.75 showed a black-gray, almost metallic color and a black-brown color as a powder. A gas which is indicated to be oxygen evolves in the course of forming the melt. All other compositions exhibited an orange to orange-brown coloration in the melt with the powders being somewhat lighter. The molded melts showed remarkable shrinkage on cooling. Therefore, it was necessary to open the form when it was very hot to obtain rods for further investigation. As stated herein the suitable binary solder compositions range from a mole ratio of $0.3Ag_2O$ to 1.0 $V_2O_5$ to 3.5 $Ag_2O$ to 1.0 $V_2O_5$. Included within this range are specific examples such as 0.333 $Ag_2O$:1.0 $V_2O_5$. The preferred compositions of the binary solder compositions at higher temperature can be carried out to intentionally cause the segregation of metallic silver and thereby enable the formation of conductive layers on various substrates.

The chemical resistance of these soldering compositions was also tested. The resistance against water, alkali materials, HCl and $H_2SO_4$ is good. However, the substance is easily soluble in nitric acid and particularly in aqeuous ammonia. This last property was exploited when cleaning the equipment used in manufacture and application of the binary compositions of this invention.

It has been noted that the addition of $Ag_2O$ lowers the already low melting point of $V_2O_5$ markedly. In the region between 1.3 to 2.0 $Ag_2O$:1.0 $V_2O_5$ it was determined that the melting point ranged between 370° and 400° C. If solders with higher melting points are desired the silver content must be increased.

It has further been observed that the orientation of the crystals appears to have a marked effect on the electrical conductivity of the compositions. To obtain comparable results, the samples were all prepared by the same method. A ring of aluminum with a diameter of 10 millimeters and a height of 5 millimeters was put on a cooled steel block. The melt was poured into this aluminum mold. After cooling, the samples were cut and compacted with an In-pencil. The results showed that the addition of a little silver led to further lowering of electrical resistance of $V_2O_5$. On further addition of $Ag_2O$, the resistance increases and reaches a maximum at $Ag_2O \cdot V_2O_5$ and then drops markedly until the composition $2Ag_2O \cdot V_2O_5$ is reached.

In forming seals between dissimilar or similar surfaces, the solder compositions may conveniently be used in the form of a frit or finely divided powder. Alternately, the sealing composition may be used as a paste with conventional organic or inorganic fugitive binders. Use of solvents and other binders in making a frit or a paste is somewhat restricted to those substances which would be burned out without decomposition or at low enough temperatures so that the organic materials did not react with the silver oxide to form silver metal. Therefore, fugitive binders are preferred which volatilize without breakdown to leave residual carbon at temperatures below which the organic matter could react with the silver oxide. Because of the range of coefficients of thermal expansion, generally above $20 \times 10^{-6}/°$ C., the compositions of this invention are particularly well suited for sealing dissimilar materials with different high expansion properties.

What is claimed is:

1. A laminate formed of two laminae and being adhered to each other by a solder composition comprising as the sole essential ingredients $Ag_2O$ and $V_2O_5$ in a mole ratio of $Ag_2O$:$V_2O_5$ ranging from 0.3 to 3.5:1.0.

2. The laminate as defined in claim 1 wherein the mole ratio is 0.5 $Ag_2O$:1.0 $V_2O_5$.

3. The laminate as defined in claim 1 wherein the mole ratio is 3.0 $Ag_2O$: 1.0 $V_2O_5$.

4. A finely divided oxidic solder composition consisting essentially of a binary admixture of $Ag_2O$ and $V_2O_5$ in the mole ratio ranging from 0.3 to 3.5 $Ag_2O$:1.0 $V_2O_5$.

5. A finely divided oxidic solder composition as defined in claim 4 wherein the mole ratio is 0.5 to 3.0 $Ag_2O$: 1.0 $V_2O_5$.

6. A substrate selected from the group consisting of glass, ceramic, metal and carbon having adhered thereto a layer of a solder composition consisting essentially of a fused, binary admixture of $Ag_2O$ and $V_2O_5$ in the mole ratio ranging from 0.3 to 3.5 $Ag_2O$:1.0 $V_2O_5$.

7. A substrate as defined in claim 6 wherein said mole ratio is 0.5 to 3.0 $Ag_2O$:1.0 $V_2O_5$.

8. A substrate as defined in claim 6 wherein said substrate is metal.

9. A substrate as defined in claim 6 wherein said substrate is glass.

10. An oxidic composition consisting essentially of a binary admixture of $Ag_2O$ and $V_2O_5$ in the mole ratio ranging from 0.3 to 3.5 $Ag_2O$:1.0 $V_2O_5$.

11. An oxidic solder composition as defined in claim 10 wherein the mole ratio is 0.5 to 3.0 $Ag_2O$:1.0 $V_2O_5$.

12. An oxidic solder composition as defined in claim 11 wherein the mole ratio is 0.5 $Ag_2O$:1.0 $V_2O_5$.

13. An oxidic solder composition as defined in claim 11 wherein the mole ratio is 3.0 $Ag_2O$:1.0 $V_2O_5$.

* * * * *